United States Patent
Kinnaman

(10) Patent No.: US 9,680,955 B1
(45) Date of Patent: Jun. 13, 2017

(54) PERSISTENT LOCAL CACHING OF IMAGE DATA ON A COMPUTING DEVICE

(71) Applicant: The Weather Channel, LLC, Atlanta, GA (US)

(72) Inventor: Kyle Adam Kinnaman, Woodstock, GA (US)

(73) Assignee: TWC Patent Trust LLT, Burlington, VT (US)

( * ) Notice: Subject to any disclaimer, the term of this patent is extended or adjusted under 35 U.S.C. 154(b) by 244 days.

(21) Appl. No.: 14/205,518

(22) Filed: Mar. 12, 2014

Related U.S. Application Data

(60) Provisional application No. 61/781,443, filed on Mar. 14, 2013.

(51) Int. Cl.
*H04L 29/08* (2006.01)

(52) U.S. Cl.
CPC ................................ *H04L 67/2842* (2013.01)

(58) Field of Classification Search
CPC ......................... H04L 67/2842; H04L 67/2847
See application file for complete search history.

(56) References Cited

U.S. PATENT DOCUMENTS

| | | | | |
|---|---|---|---|---|
| 6,959,318 B1* | 10/2005 | Tso | .................... | G06F 17/30902 707/E17.12 |
| 8,977,653 B1* | 3/2015 | Mahkovec | ........ | G06F 17/30899 707/769 |
| 2009/0019153 A1* | 1/2009 | Sebastian | .......... | G06F 17/30902 709/224 |
| 2013/0103740 A1* | 4/2013 | Tully | .................... | H04N 21/251 709/203 |
| 2013/0124621 A1* | 5/2013 | Lepeska | ............ | G06F 17/30902 709/203 |
| 2014/0019575 A1* | 1/2014 | Alexander, Jr. | ... | G06F 17/30902 709/213 |

OTHER PUBLICATIONS

S. Josefsson, "The Base16, Base32, and Base64 Data Encodings", Oct. 2006, The Internet Society, RFC 4648, p. 5-15.*

* cited by examiner

*Primary Examiner* — Chris Parry
*Assistant Examiner* — Caroline Jahnige
(74) *Attorney, Agent, or Firm* — Meunier Carlin & Curfman LLC

(57) ABSTRACT

Systems and methods that utilize local storage associated with web browsers to store image data as an alphanumeric string. An expiration date may be associated with the image data such that it expires either after predetermined period of time or at a certain date. By storing image data in local storage, as a user navigates to a website, images are loaded from local storage and displayed in the web browser rather than fetching the image data from a remote source.

16 Claims, 4 Drawing Sheets

PERSISTENT LOCAL CACHING OF IMAGE DATA ON A COMPUTING DEVICE

CROSS-REFERENCE TO RELATED APPLICATION

This application claims priority to U.S. Provisional Application No. 61/781,443, entitled "Persistent Local Caching of Image Data on a Computing Device," filed Mar. 14, 2013, which is incorporated herein by reference in its entirety.

BACKGROUND

Online advertisers often struggle to maximize the effectiveness of their advertisements by attempting to transmit advertisements that are most likely to be of interest to the recipient. One problem is the timeliness at which advertising images are displayed on a web page. For example, a given web page may have multiple advertising images that may be loaded from various advertising servers across the Internet. Each of the advertising servers has an associated latency, which causes a delay in loading images from the advertising server. Because of such delays, a user may either scroll through, or navigate away, from a web page before an advertisement is loaded. Thus, the effectiveness of an advertising campaign is reduced.

Another problem is bandwidth utilization associated with serving images, such as advertising images. Each time a web page is loaded, uncached images associated with the web page are fetched from an image server for display in a web browser. If the image server is serving large numbers of requests for images, the costs associated with serving the images can become very high.

SUMMARY

Systems and methods that utilize local storage associated with web browsers to store image data as an alphanumeric string. An expiration date may be associated with the image data such that it expires either after predetermined period of time or at a certain date. By storing image data in local storage, as a user navigates to a website, images are loaded from local storage and displayed in the web browser rather than fetching the image data from a remote source.

In accordance with the present disclosure, there is provided a method for displaying an image. The method includes receiving, at a server computing device, a request for content, the request for content including a request for the image; determining, at a client computing device, if the image is contained in a local storage object, and if so; determining if the image has expired in accordance with a predetermined expiration date; retrieving the image from the local storage if the image is not expired; and presenting the image on a display of the client computing device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The present disclosure presents implementations for utilizing a persistent, local storage area of a computing device to store image data (and other types of data) as an alphanumeric string. The data may be stored in the local storage area by, e.g., a website, and retrieved when a user action results in a request for the data. By retrieving data from the local storage, less additional user requests that require data to be fetched over a network (e.g., the Internet) are made, thus resulting in faster loading time and less bandwidth utilization. In some implementations, the data in the local storage may be expired in at the end of a predetermined period or on a specific date in order to prevent time-sensitive data from becoming used after it is no longer valid.

Figure 1:
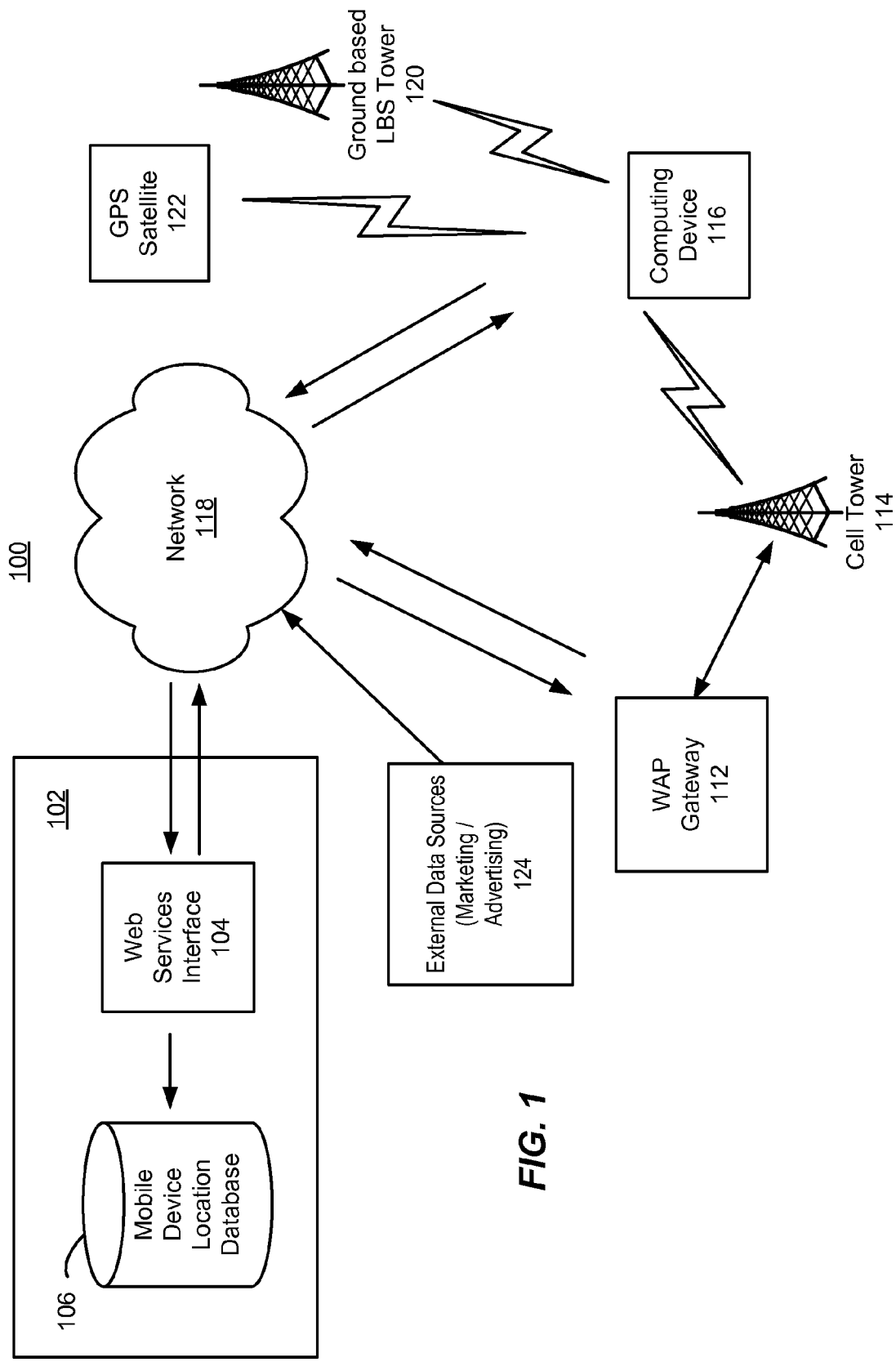
FIG. 1 illustrates an exemplary environment for providing location-based multimedia content to a computing device.

Thus, with the introduction above, FIG. 1 illustrates an exemplary environment 100 for providing content to a computing device in which aspects of the present disclosure may be practiced. The environment of FIG. 1 should not be construed as limiting the present disclosure, as it is provided for exemplary purposes only. As shown in FIG. 1, a service provider 102 may have a web services interface 104 and, optionally, a mobile device location database 106. The web services interface 104 may be one or more servers that provide an interface to web services and information provided by the service provider 102. The web services interface 104 is typically placed behind one or more firewalls and a proxy gateway. The web services interface 104 provides access to back-end applications and servers on a private network of the service provider 102.

Web services are typically deployed on application servers that may use business-logic-layer software components in a multi-tier software architecture to provide information, computation and data access functions. Web services can interact with other web services distributed across the internet, as well as server-side components implemented as classes (e.g., Enterprise Java Bean or Microsoft COM components) within the same enterprise network (e.g., within the service provider 102).

The web services interface 104 may provide a broad range of functions, such as providing content to a client device such as computing device 116. The computing device may be a mobile computing device, such as that shown in FIG. 2 or a desktop computer, a tablet device, a notebook/laptop computer), such as that described with respect to FIG. 4. The content may be any type of content, including, but not limited to web pages, audio, video and advertising. In some implementations, the content may be location-specific based on determined location of the computing device 116. In such instances, the mobile device location database 106 may store locations of computing devices 116 that either subscribe to services offered by the service provider 102 or that communicate location information to the service provider 102 (e.g., by a user entering the location information in the form of a geographic location or ZIP code).

A network 118 may be any communications network, including the Internet and/or mobile networks, such as GPRS, EDGE, WCDMA, 3G, LTE. The network may include a WAP Gateway 112 that serves as proxy or a service enabler located in a service layer, between the Internet and mobile networks. The WAP protocol runs like a tunnel from the mobile via radio communications towards the connectivity layer, the control layer and finally the service layer. The WAP gateway 112 operates as a protocol converter between WAP protocols and common HTTP/TCP used by web servers on the Internet, such as the web services interface 104. As illustrated, the gateway 112 may communicate to the computing device 116 over one or more cell towers 114 associated with the network provider (e.g., AT&T, Verizon Wireless, Sprint, etc.) of the computing device 116. The service layer may include other service enablers for internet mobile applications.

External data sources 124 may be communicatively coupled the service provider 102 through the network 118. The external data sources 124 may include media that is used to populate web pages and other requests made to the web services interface 104. For example, a request by the computing device 116 for a web page may trigger additional requests to the external data sources 124 for advertising creatives (e.g., images and other rich media). The weather advertising creatives may be associated with the web page requested by the computing device 116 by a location identifier, such that the data provided by the external data sources 124 is geographical and/or temporally relevant to the request. Other items of interest may be included in the external data sources 124, such as historic sites, parks and recreation areas, sporting venues, etc. Similarly, this information may be geographically coded and communicated to computing devices 116.

Figure 2:
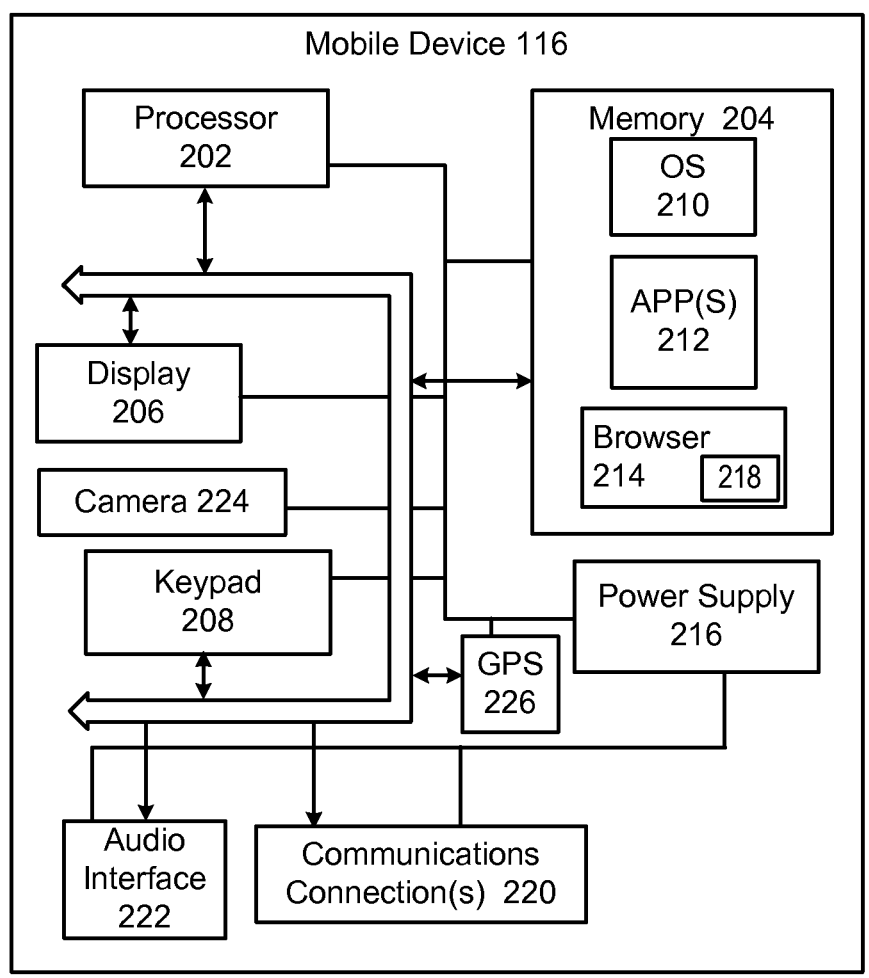
FIG. 2 illustrates a mobile device in greater detail.
Figure 4:
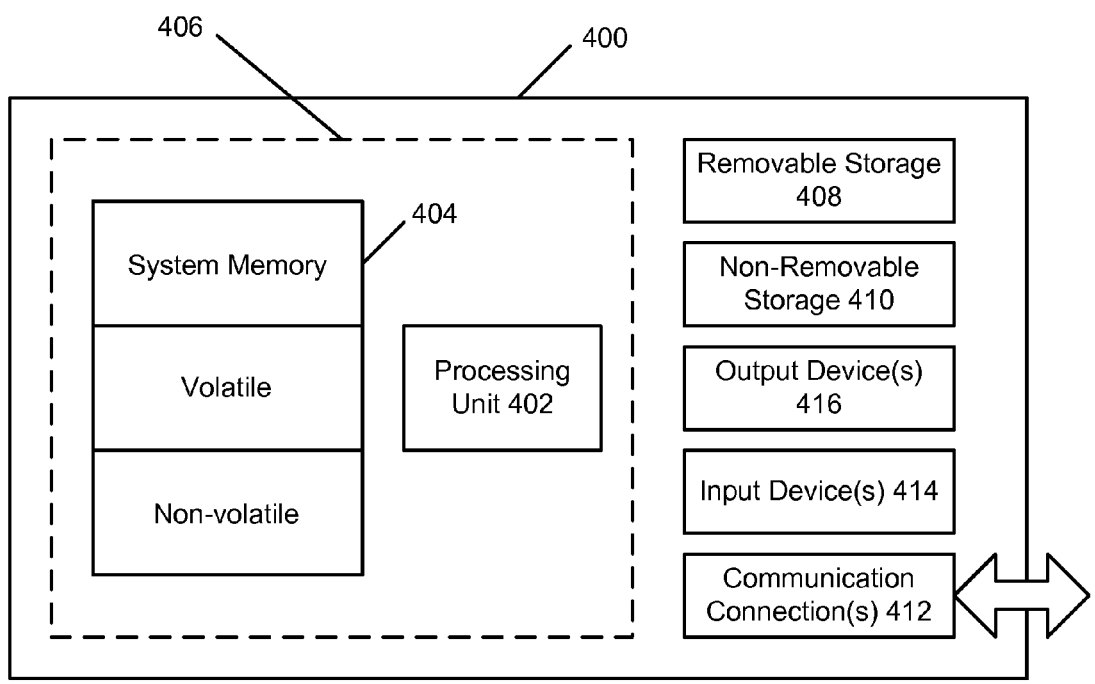
FIG. 4 illustrates an example system for implementing aspects of implementations of the disclosure.

The computing device 116 may be configured in many different ways. For example, the computing device 116 may be a mobile phone, a PDA, a mobile computer, and the like. FIG. 2 illustrates the computing device 116 in greater detail when configured as a mobile device. FIG. 4, below, illustrates the computing device 116 as a general purpose computing device. The computing device 116 may includes a processor 202, a memory 204, a display 206, and a keypad 208. The memory 204 generally includes both volatile memory (e.g., RAM) and non-volatile memory (e.g., ROM, Flash Memory, or the like). The computing device 116 includes an operating system 210, such as the iOS, Android, Blackberry, Windows Phone operating systems, or another operating system, which is resident in the memory 204 and executes on the processor 202.

The keypad 208 may be a push button numeric dialing pad (such as on a typical telephone), a multi-key keyboard (such as a conventional keyboard). The display 206 may be a liquid crystal display, or any other type of display commonly used in computing devices. The display 206 may be touch-sensitive, and may act as an input device.

One or more native application programs 212 may be loaded into the memory 204 and run on the operating system 210. The computing device 116 may also include a non-volatile storage within memory 204. The non-volatile storage may be used to store persistent information which should not be lost if computing device 116 is powered down. A web browser 214 provides an environment by which a user may access information over the network 118 by entering a Uniform Resource Locator (URL) of, e.g., the service provider 102 and/or the web services interface 104. Alternatively, the URL may be of any server accessible on the network 118 by the computing device 116.

The computing device 116 includes a power supply 216, which may be implemented as one or more batteries. The power supply 216 might further include an external power source, such as an AC adapter or a powered docking cradle that supplements or recharges the batteries. The computing device 116 may include an audio interface 222 to provide audible signals to and receive audible signals from the user. For example, the audio interface 222 may be coupled to a speaker for providing audible output and to a microphone for receiving audible input, such as to facilitate a telephone conversation.

Computing device 116 also includes communications connection(s) 220, such as a wireless interface layer, that performs the function of transmitting and receiving communications, or a wired interface, such as a USB connection between the computing device 116 and another computing device. The communications connection(s) 220 facilitates wireless connectivity between the computing device 116 and the outside world. The communication connection 220 may be configured to connect to any type of wireless network. According to one implementation, transmissions to and from the communications connection(s) 220 are conducted under control of the operating system 210.

The computing device 116 may include a camera 224 as an input device. The camera 224 may be activated through an action on the keypad 208 or touch-sensitive display 206. The camera 224 may include a multi-megapixel charge-coupled display (CCD) imaging device. Pictures or video taken by the camera may be stored in the memory 204.

The computing device 116 may include a GPS receiver 226 that receives signals from one or more GPS satellites 122. By locating several GPS satellites 122, the GPS receiver 226 may determine the distance to each satellite and use this information to deduce the location of the computing device 116. This operation is based on a mathematical principle called trilateration. If the computing device 116 does not include a GPS receiver 226, other methods of trilateration may be used by determining radio signal strengths from ground based LBS tower(s) 120 or using information from the network 118.

In accordance with aspects of the present disclosure, content may be stored by the web browser 214 within a "Local Storage" or "DOM Storage" 218. Web pages are able to locally store named key/value pairs within the local storage 218 such that the data persists after a user navigates away from a website or closes the browser 214. Unlike cookies, data in the local storage 218 is not transmitted to a remote web server. Rather, the data in the local storage 218 is used only when requested and is domain specific. As such, only an origin or origin-approved third party domain may place the information in and retrieve it from local storage.

A localStorage object is used for storing data in the local storage 218 of the web browser 214. The localStorage object stores data with no expiration date, however, in some implementations, an expiration date may be associated with the key/value pairs, as described below. The data may be expired because the local storage space is limited (e.g., to 5 MB), because the data is time-sensitive, or for any business-logic reason that is applied to the data to be stored in the local storage 218.

In accordance with some implementations, the local storage 218 is utilized by website to store multimedia data (e.g., image data, audio data, video data) by converting the multimedia data from a binary format to an alphanumeric string representation. For example, the binary data may be BASE64 encoded and stored in the local storage 218. Other encoding schemes may be used to represent the binary data as an alphanumeric string.

In operation, as a user navigates to a website, rather than fetching the multimedia data from a remote source of the multimedia data, the multimedia data is loaded from local storage, converted from the alphanumeric representation to a binary file (e.g., a JPEG image file or other suitable format), and displayed in the web browser 214.

Figure 3:
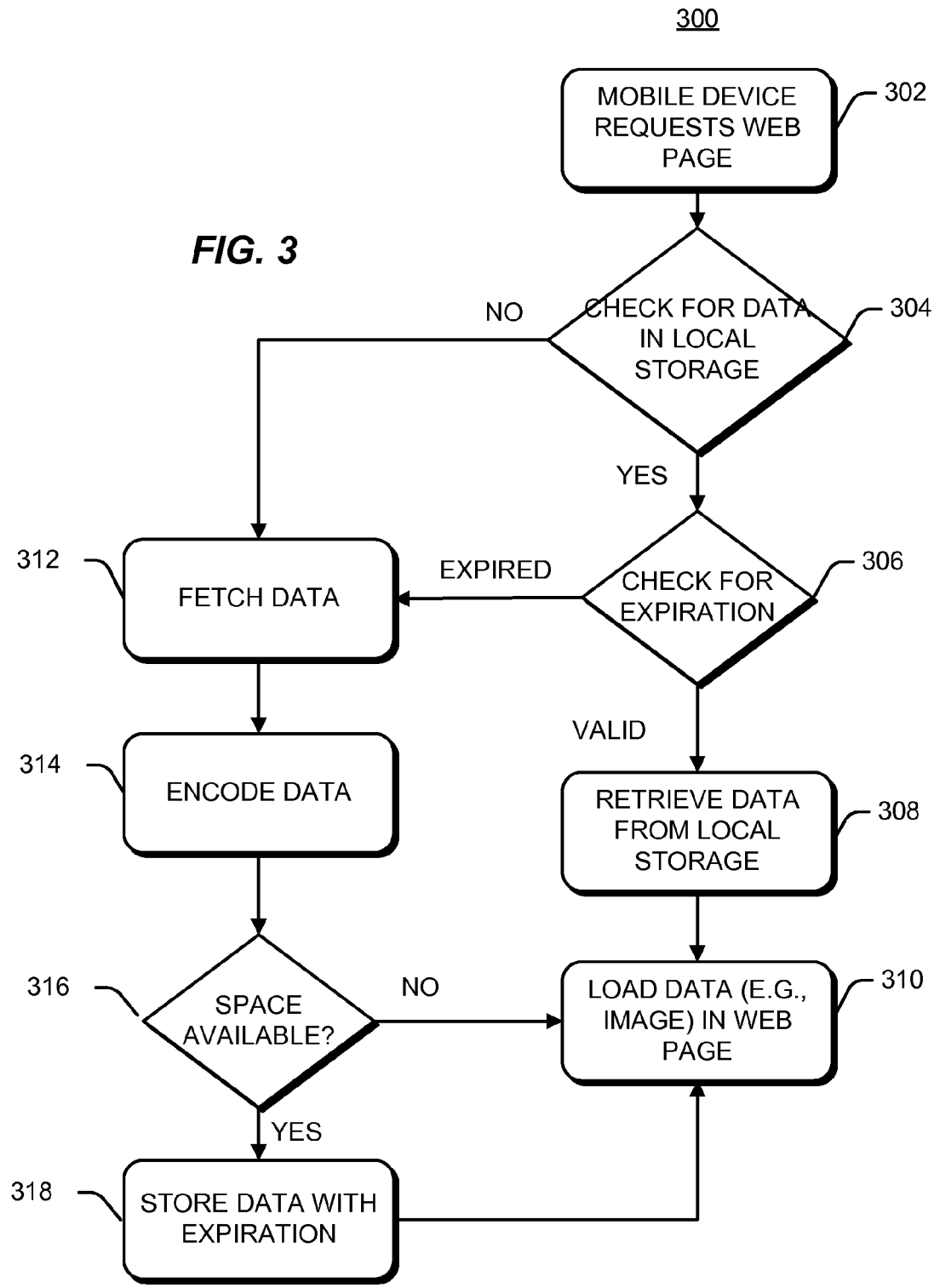
FIG. 3 is an operational flow chart depicting exemplary processes performed within the environment of FIGS. 1 and 2.

FIG. 3 illustrates an example operational flow 300 of processes performed in accordance with the present disclosure. The process begins at 302, when a computing device requests a web page. For example, the computing device 116 makes a request for a web page from the service provider 102 as a result of a user entering or clicking the URL of the service provider in the web browser 214. At 304, a check is made to see if an image (or other data) to be retrieved as a result of the request is contained in local storage. A script (e.g., JavaScript) may be run on the web page associated with the request to determine if the requested image is contained within the local storage 218. For example, the following may be executed to determine the existence of image data in the local storage 218: localstorageTest=document.getElementById('localstorageTest').

If the requested image or other data is contained in the local storage, then the check is performed at 306 to determine if image contained in local storage has expired. As noted above, an expiration date may be associated with the key pair identifying image data in local stores 218. For example, the following test may be performed: keyImgExpires=Date.parse(localStorage.getItem(key+'expires')). If at 306 it is determined that the image or other data is valid, then at 308, image is retrieved from local storage. At 310, the image or other data is loaded in the web page from local storage at a position identified by the web page. The loading operation at 301 may include converting an alphanumeric representation of the image or other data to a binary file format, such as a JPEG or other image file format.

If at 304 it is determined that the image or other data is not contained in the local storage, then the process continues at 312 where the data is fetched at the URL specified in the web page. Similarly, if at 306 it is determined that an image or other data has expired, then the associated image or other data is removed from local storage and the data is fetched at 312 at the specified URL. The image data may be removed from the local storage 218 using the following: localStorage.removeItem(key).

Next, at 314 the image or other data is encoded to prepare the data storage in the local storage 218. In particular, the local storage 218 is provided to store alphanumeric data (e.g., ASCII), rather than binary data. As such in accordance with the present disclosure, binary data, such as multimedia files, is converted to an alphanumeric representation (e.g. BASE64) to enable such binary data to be stored in the local storage 218. In some implementations, rather than converting the image or other data directly to an alphanumeric representation, a first array of characters is created from the image or other data. A length of the first array is determined and a second array is created based on the length of the first array. If the second array has a length that is greater than zero, then a corresponding character in the first array is converted to a string in the second array. All strings in the second array are concatenated to form a resulting string, which may be then encoded to an alphanumeric representation (e.g., BASE64).

Next at 316, is determined if there space available in the local storage to store the newly fetched data. If there is space available in the local storage, then at 318 the newly fetched image is stored in local storage. For example, the following may be executed to store the new image data: localStorage.setItem(csKey, dataURL). Next, the process continues at 310, where the image or other data is loaded in the web page.

In accordance with the above operational flow 300, for example, if the web page requested by user contains an image that is not stored in the local storage 218, the following determinations and actions may be performed:

- image not set in localstorage (resulting from determination at 304)
- fetched and displayed image in 2006 ms (resulting from action at 312)
- converted image to base64 data (resulting from action at 314)
- queried available localstorage (resulting from determination at 316)
- image data length less than available localstorage size, set data expiry in localstorage key/value pair (resulting from action at 318)
- set image data in localstorage key/value pair (resulting from action at 318).

As another example, if the web page requested by user contains an image that is stored in the local storage 218, the following determinations and actions may be performed:

- image data found in localstorage and written to adspace in 0 ms (resulting from determinations and actions at 302-310).

Thus, the above examples illustrate that an image fetched and displayed from the target URL has a latency, e.g., 2006 ms, whereas retrieving the image from local storage results in latency of 0 ms. As such, in the latter example where the image is stored in local storage, the image may be presented near instantaneously. Further, retrieving the image from local storage saves bandwidth utilization by both the requesting device (e.g., the computing device 116) and the external data source 124 and/or service provider 102 providing the image data.

In some implementations, a sequence of images may be stored in the local storage 218 to create a video presentation in the web browser 214. While the above is described respect to image data, it is noted that any type of data may be stored in the local storage 218. For example, banking data, clear text, site owner information, scripts and other information may be stored in the local storage 218.

Below is an example script implementing the above operational flow 300:

```
<div id="banner"></div>
<script>
    (function ( ) {
        var base64,
            binaryString,
            creativeVersion = '0',
            csKey = 'banner',
            data,
            expires,
            expiresDate,
            i,
            key,
            keyImgExpires,
            localImg,
            localstorageRemaining,
            banner = document.getElementById('banner'),
            now = Date.parse(new Date( )),
            remoteImg =
'http://s.imwx.com/ads/creatives/resources/images/320x50.png',
            uInt8Array;
// set banner size and cross-origin properties (sets up AJAX request for image)
        banner.style.width = 320;
        banner.style.height = 50;
        banner.style.backgroundSize = '320px 50px';
        banner.crossOrigin = ' ';
        function createXHR( ) {
            return new XMLHttpRequest( );
        }
```

-continued

```
// localstorage or cross-origin resource sharing not enabled
    function defaultImage( ) {
        banner.style.backgroundImage = 'url(' + remoteImg + ')';
    }
// if room available in localstorage, create expiry for localstorage
objects and write objects to localstorage
    function imgChecker(dataURL) {
        if (base64.1ength < localstorageRemaining) {
            expires = new Date( );
            expiresDate = expires.getDate( );
            expires.setDate(expiresDate + 7);
            localStorage.setItem(csKey, dataURL);
            localStorage.setItem(csKey +'_expires', expires);
            localStorage.setItem(csKey + '_version', creativeVersion);
        }
    }
// retrive remote image from external domain, base64 encode and write
base64 image to UI
    function getImage(imgPath, imgElement) {
        var xhr = createXHR( );
        xhr.onreadystatechange = function ( ) {
            if (xhr.readyState === 4 && xhr.status === 200) {
// varies from original canvas method. Faster, but supported by fewer
browsers
// create a new array of characters from the image data
                uInt8Array = new Uint8Array(this.response);
// get length of new array
                i = uInt8Array.length;
// create second array based on length of first
                binaryString = new Array(i);
// if 2nd array length > 0, convert the corresponding character in
the first array to a string in the second array
                while (i--) {
                    binaryString[i] = String.fromCharCode(uInt8Array[i]);
                }
// concatenate all the strings in the second array
                data = binaryString.join(' ');
// base64 encode the resultant string (from the 2nd array)
                base64 = window.btoa(data);
// write the base64 string as a data URI for the chosen DOM element
                document.getElementById(imgElement).style.backgroundImage =
'url(data:image/png;base64,' + base64 + ')';
// attempt to store the base64 string in localstorage
                imgChecker('url(data:image/png;base64,' + base64 + ')');
            } else if (xhr.readyState === 4 && xhr.status !== 200) {
                defaultImage( );
            }
        };
        xhr.open('GET', imgPath);
        xhr.responseType = 'arraybuffer';
        xhr.send(null);
    }
    if (localStorage) {
        for (key = 0; i < localStorage.length; key += 1) {
            keyImgExpires = Date.parse(localStorage.getItem(key +
'_expires'));
            if (now > keyImgExpires) {
                localStorage.removeItem(key);
                localStorage.removeItem(key + '_expires');
                localStorage.removeItem(key + '_version');
            }
        }
        localstorageRemaining = ((1024 * 1024 * 5) −
localStorage.length);
        localImg = localStorage.getItem(csKey);
        if (localImg && (creativeVersion === localStorage.getItem(csKey +
'_version'))) {
            banner.style.backgroundImage = localImg;
        } else {
            localStorage.removeItem(key);
            localStorage.removeItem(key + '_expires');
            localStorage.removeItem(key + '_version');
            getImage(remoteImg, 'banner');
        }
    } else {
        defaultImage( );
    }
}( )) ;
</script>
```

With reference to FIG. 4, there is illustrated another example system 400 for implementing aspects of the present disclosure. In its most basic configuration, the system 400 may be a general purpose computing device, such as a desktop, a notebook, a workstation or the like and typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

The system 400 may have additional features/functionality. For example, the system 400 may include additional storage (removable and/or non-removable) including, but not limited to, magnetic or optical disks or tape. Such additional storage is illustrated in FIG. 4 by removable storage 408 and non-removable storage 410.

The system 400 typically includes a variety of computer readable media. Computer readable media can be any available media that can be accessed by the system 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the system 400. Any such computer storage media may be part of the system 400.

The system 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The system 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

What is claimed:

1. A method for displaying an image at a client computing device, comprising:
   requesting, using the client computing device, content from a server computing device, the request for content including a request for the image;
   receiving, using the client computing device, a script from the server computing device, the script associated with the request for content;
   running the script on the client computing device to determine if the image is contained in local storage, and if so:
      determining if the image has expired in accordance with a predetermined expiration date, and if so:
         removing the image from the local storage;
         fetching the image from a remote location to the client computing device;
         presenting the image on the display of the client computing device;
         encoding the image fetched from the remote location to create encoded image data,
            wherein the encoding comprises:
               creating a first array of characters from the image,
               determining a length of the first array,
               generating a resulting string based on the length of the first array, and
               creating the encoded image data from the resulting string; and
         storing the encoded image data in local storage; otherwise:
      retrieving the image from the local storage if the image is not expired; and
      presenting the image on a display of the client computing device.

2. The method of claim 1, wherein the generating a resulting string based on the length of the first array comprises:
   creating a second array based on the length of the first array;
   converting a corresponding character in the first array to a string in the second array; and
   concatenating strings in the second array to generate the resulting string.

3. The method of claim 1, further comprising assigning an expiration to the encoded image data using a key/value pair stored in local storage.

4. The method of claim 1, wherein the encoded image data is BASE64 encoded.

5. The method of claim 1, if the image is not contained in the local storage, the method further comprising:
   fetching the image from a remote location to the client computing device; and
   encoding the image fetched from remote location to create encoded image data, wherein
      the encoding comprises:
         creating a first array of characters from the image,
         determining a length of the first array,
         generating a resulting string based on the length of the first array, and
         creating the encoded image data from the resulting string;
   storing the encoded image data in local storage; and
   presenting the image on the display of the client computing device.

6. The method of claim 5, wherein the generating a resulting string based on the length of the first array comprises:
   creating a second array based on the length of the first array;
   converting a corresponding character in the first array to a string in the second array; and
   concatenating strings in the second array to generate the resulting string.

7. The method of claim 5, further comprising assigning an expiration to the encoded image data using a key/value pair stored in local storage.

8. The method of claim 5, wherein the encoded image data is BASE64 encoded.

9. A non-transitory tangible computer readable medium having computer readable instructions stored thereon, that when executed by a client computing device performs a method of displaying an image, comprising:
    requesting, using the client computing device content from a server computing device, the request for content including a request for the image;
    receiving, using the client computing device, a script from the server computing device, the script associated with the request for content;
    running the script on the client computing device to determine if the image is contained in local storage, and if so;
        determining if the image has expired in accordance with a predetermined expiration date, and if so:
        removing the image from the local storage,
        fetching the image from a remote location to the client computing device,
        presenting the image on the display of the client computing device,
        encoding the image fetched from remote location to create encoded image data,
            wherein the encoding comprises:
            creating a first array of characters from the image;
            determining a length of the first array;
            generating a resulting string based on the length of the first array, and
            creating the encoded image data from the resulting string, and
        storing the encoded image data in local storage; otherwise:
    retrieving the image from the local storage if the image is not expired; and
    presenting the image on a display of the client computing device.

10. The non-transitory tangible computer readable medium of claim 9, the generating further comprising instructions for:
    creating a second array based on the length of the first array;
    converting a corresponding character in the first array to a string in the second array; and
    concatenating strings in the second array to generate the resulting string.

11. The non-transitory tangible computer readable medium of claim 9, further comprising instructions for assigning an expiration to the encoded image data using a key/value pair stored in local storage.

12. The non-transitory tangible computer readable medium of claim 9, wherein the encoded image data is BASE64 encoded.

13. The non-transitory tangible computer readable medium of claim 9, if the image is not contained in the local storage, the tangible computer readable medium further comprising instructions for:
    fetching the image from a remote location to the client computing device; and
    encoding the image fetched from remote location to create encoded image data, wherein
        the encoding comprises:
        creating a first array of characters from the image,
        determining a length of the first array,
        generating a resulting string based on the length of the first array, and
        creating the encoded image data from the resulting string;
    storing the encoded image data in local storage; and
    presenting the image on the display of the client computing device.

14. The non-transitory tangible computer readable medium of claim 13, the encoding further comprising instructions for:
    creating a second array based on the length of the first array;
    converting a corresponding character in the first array to a string in the second array; and
    concatenating strings in the second array to generate the resulting string.

15. The non-transitory tangible computer readable medium of claim 13, further comprising instructions for assigning an expiration to the encoded image data using a key/value pair stored in local storage.

16. The non-transitory tangible computer readable medium of claim 13, wherein the encoded image data is BASE64 encoded.

\* \* \* \* \*